(12) United States Patent
Wakashiro et al.

(10) Patent No.: US 6,837,320 B2
(45) Date of Patent: Jan. 4, 2005

(54) CONTROL DEVICE FOR HYBRID VEHICLE

(75) Inventors: Teruo Wakashiro, Shioya-gun (JP);
Shigetaka Kuroda, Utsunomiya (JP);
Atsushi Matsubara, Utsunomiya (JP);
Shinichi Kitajima, Utsunomiya (JP);
Atsushi Izumiura, Utsunomiya (JP);
Yasuo Nakamoto, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 76 days.

(21) Appl. No.: 10/301,650

(22) Filed: Nov. 22, 2002

(65) Prior Publication Data

US 2003/0102175 A1 Jun. 5, 2003

(30) Foreign Application Priority Data

Nov. 30, 2001 (JP) ........................................ 2001-367636

(51) Int. Cl.[7] ................................................ B60K 6/04
(52) U.S. Cl. ..................................... 180/65.2; 180/65.4
(58) Field of Search .............................. 180/65.2, 65.3, 180/65.4; 701/29, 70

(56) References Cited

U.S. PATENT DOCUMENTS

| | | | | |
|---|---|---|---|---|
| 4,313,080 A | * | 1/1982 | Park ............................ | 320/123 |
| 4,335,429 A | * | 6/1982 | Kawakatsu .................. | 701/102 |
| 5,550,445 A | * | 8/1996 | Nii .............................. | 318/153 |
| 5,664,635 A | * | 9/1997 | Koga et al. ................. | 180/65.3 |
| 5,785,138 A | * | 7/1998 | Yoshida ...................... | 180/65.2 |
| 5,788,597 A | * | 8/1998 | Boll et al. ..................... | 477/4 |
| 5,899,828 A | * | 5/1999 | Yamazaki et al. ............ | 477/4 |
| 5,992,153 A | * | 11/1999 | Tsuchihashi et al. .......... | 60/716 |
| 6,098,733 A | * | 8/2000 | Ibaraki et al. .............. | 180/65.2 |
| 6,307,277 B1 | * | 10/2001 | Tamai et al. ............... | 290/40 C |
| 6,401,684 B2 | * | 6/2002 | Hori et al. ................ | 123/198 F |
| 6,445,982 B1 | * | 9/2002 | Swales et al. ................ | 701/22 |

FOREIGN PATENT DOCUMENTS

| | | |
|---|---|---|
| JP | 57-131840 | 8/1982 |
| JP | 61-066820 | 4/1986 |

OTHER PUBLICATIONS

Office Action Dated Apr. 6, 2004 of Japanese Application No. 2001–367636.

* cited by examiner

Primary Examiner—Frank Vanaman
(74) Attorney, Agent, or Firm—Arent Fox PLLC

(57) ABSTRACT

A hybrid vehicle comprises an engine and a motor as its drive sources. The hybrid vehicle also comprises a control device which stops the fuel supply to the engine at the time of vehicle deceleration, and performs regenerative braking by the motor depending on the deceleration state, in which the engine is a cylinder deactivation engine capable of switching between all cylinder operation for operating all cylinders and cylinder deactivation operation for deactivating at least one or more cylinders. The cylinder deactivation operation is conducted during deceleration state of the vehicle to reduce pumping losses of the engine so that the regeneration efficiency of the motor is improved. The control device comprises an abnormality detection device which detects abnormality in the cylinder deactivation engine, and a motor output limiting device which limits the output of the motor in response to the detection of the abnormality.

6 Claims, 9 Drawing Sheets

CONTROL DEVICE FOR HYBRID VEHICLE

BACKGROUND OF THE INVENTION

1. Field of the Invention

The present invention relates to a control device for a hybrid vehicle. In particular, the invention relates to a control device for a hybrid vehicle that can perform cylinder deactivation operation.

2. Description of the Related Art

In general, parallel hybrid vehicles are controlled in various ways such that the driving output of the engine of a hybrid vehicle is assisted by a motor at the time of acceleration, while at the time of deceleration, battery is charged by deceleration regeneration, so that the state of charge (electrical energy) of the battery can be maintained while satisfying the requirements of the driver. Furthermore, since the engine and the motor are connected in series from the structural point of view, the structure of the vehicle becomes simple, and the weight of the whole system may be reduced. Therefore, a high degree of freedom can be obtained in loading equipment.

In order to avoid the influence of engine friction (engine brake) at the time of deceleration regeneration, a particular structure for the aforementioned parallel hybrid vehicle has been proposed to provide a clutch between the engine and motor as shown, for example, refer to Japanese Unexamined Patent Application, First Publication No. 2000-97068.

However, when the clutch is installed between the engine and motor, a problem occurs in that the construction becomes complicated by installing the clutch and the loading of equipment becomes more difficult, and, in addition, due to usage of the clutch, the transmission efficiency of the power transmission system is reduced during deceleration regeneration and during traveling of the vehicle.

In contrast, at the time of deceleration, it has been offered to perform a cylinder deactivation operation by deactivating at least one cylinder for reducing the pumping loss of the engine. This improves the regeneration efficiency of the motor during deceleration.

However, in the control device of a hybrid vehicle which reduces the engine friction by deactivating cylinders at the time of deceleration and which increases the amount of regeneration by the amount equivalent to the engine friction, a problem arises in that, if the cylinder deactivation does not function due to a failure, then the increasing amount of regeneration energy due to deactivating the cylinders cannot be restored, which affects on the energy management of the hybrid vehicle.

SUMMARY OF THE INVENTION

In order to solve the aforementioned problem, a first aspect of the present invention provides a control device for a hybrid vehicle, in which, the hybrid vehicle is provided with an engine (for example, engine E in the embodiment) and a motor (for example, motor M in the embodiment) as the drive sources, the control device stops fuel supply to the engine at the time of vehicle deceleration and performs regenerative braking by the motor depending on the deceleration state, said engine is a cylinder deactivation engine capable of switching between all cylinder activating operation for operating all cylinders and cylinder deactivation operation for deactivation more than one cylinder, and said cylinder deactivation operation being carried out depending on the deceleration state of said vehicle to reduce pumping losses of the engine, so that the regeneration efficiency of the motor is improved, wherein the control device further provided an abnormality detection device (for example, steps S702 and step S704 in the embodiment) which detects abnormalities of said deactivated cylinder of the engine, and a motor output limiting device which limits the output of said motor when the abnormality of the deactivation engine is detected by said abnormality detection device.

By the above construction, if the abnormality detection device detects an abnormality in the cylinder deactivated engine, it is possible to cope with the abnormality since the increasing regeneration energy, which would be maintained if cylinder deactivation operation is operating normally, is reduced compared with that at the normal time, by limiting the assist by the motor by using the motor output limiting device (for example, step 411A and step 411C in the embodiment).

According to the second aspect of the invention, the control device of the hybrid vehicle of the present invention detects a running condition of the engine, and the output of the motor is limited while the engine is in a low load state.

By the above such a construction, it is possible to limit the output of the motor while the engine is in low load state, in which the driver does not intend to accelerate the vehicle.

According to the third aspect of the present invention, the control device of the hybrid vehicle of the present invention limits the motor output by motor output limiting device based on a separate map (for example, a deactivation failure time assist amount #ASTPWRFS map in the embodiment) in which the amount of engine assist (for example, ECO assist amount ECOAST in the embodiment) by the motor is reduced compared with that at normal times.

By the above construction, when the deactivation engine fails, it is possible to perform engine assist by the motor using the map in which the assist amount is reduced.

According to the fourth aspect of the present invention, the control device of the hybrid vehicle of the present invention performs the limiting operation of the motor output by the motor output limiting device based on a correction coefficient, which is less than 1 and which is less than the normal motor assist value (for example, a correction coefficient #KFSAST at the time of cylinder deactivation in the embodiment).

By the above construction, when a cylinder deactivation engine fails, it is possible to perform engine assist by the motor at a reduced assist amount based on the correction coefficient.

According to the fifth aspect of the invention, the control device of the hybrid vehicle detects the state of charge of a battery, used for driving the motor, and when the state of charge of the battery is below a first threshold (for example, a boundary between zone A and zone B in the embodiment), the motor output is limited depending on the state of charge of the battery.

By the above construction, when the state of charge of the battery becomes lower than a predetermined first threshold, it is possible to assist by the motor, while preventing the further reduction of the state of charge of the battery.

According to the sixth aspect of the present invention, the control device of the hybrid vehicle of the present invention detects the state of charge of the battery, and when the state of charge of the battery, used for driving the motor, is determined to be less than or equal to a second threshold (boundary between zone B and zone C in the embodiment), which is less than the first threshold, the output from the battery to the motor is prohibited.

By the above construction, when it is determined that the state of charge of the battery is less than or equal to the second threshold, it is possible to prohibit the motor assist, and prevent the state of charge of the battery from being further reduced.

DETAILED DESCRIPTION OF THE INVENTION

Hereinafter, an embodiment of the present invention is described with reference to the attached figures.

Figure 1:
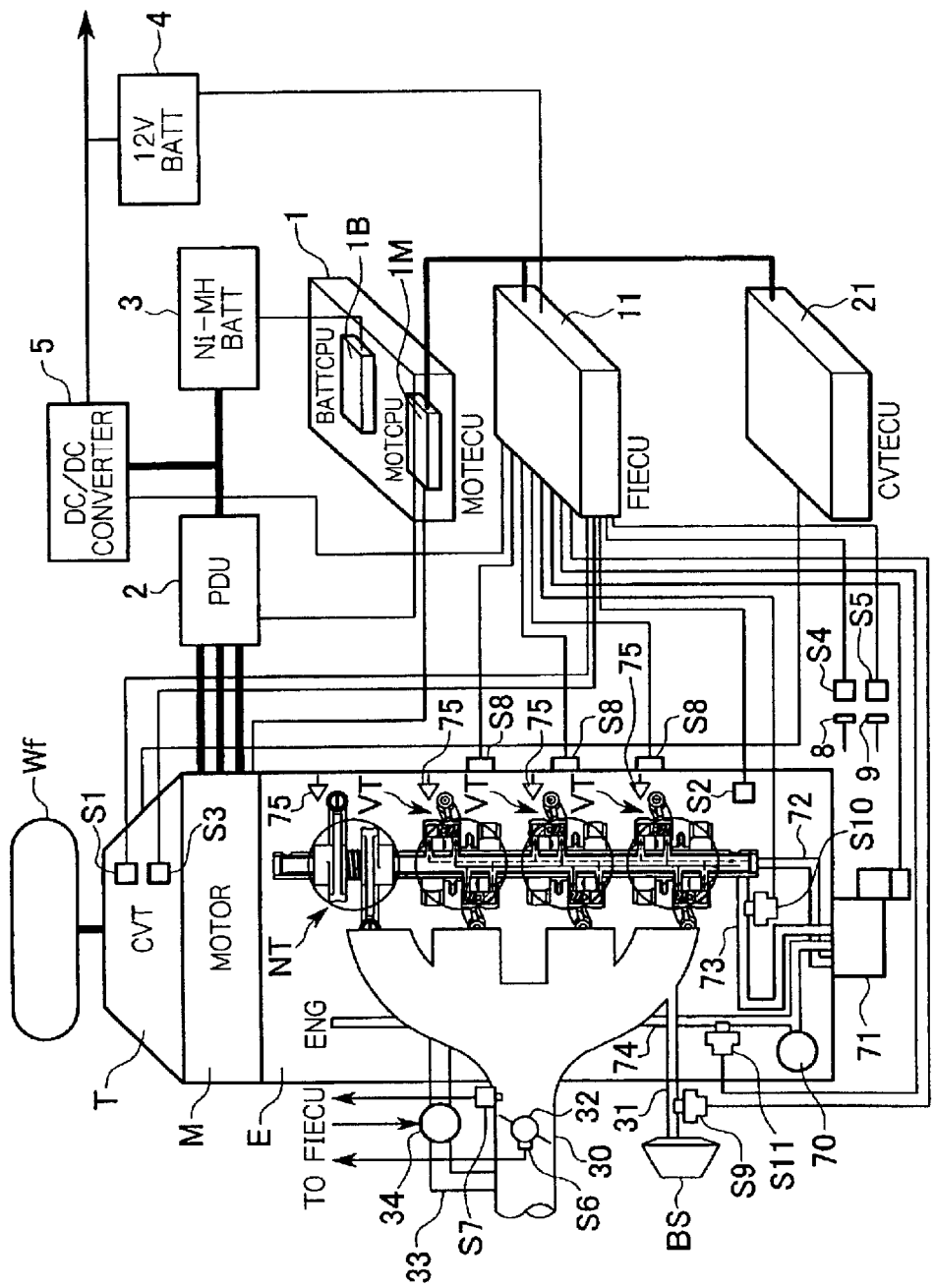
FIG. 1 is an overall structural diagram of a hybrid vehicle of an embodiment of the present invention.

FIG. 1 shows a parallel hybrid vehicle according to an embodiment of the present invention, in which an engine E and a motor M, as drive sources, and a transmission T are connected in series. The driving forces from both the engine E and the motor M are transmitted to front wheels Wf serving as drive wheels via a transmission T such as a CVT, or the like (manual transmission also applicable). Furthermore, at the time of deceleration of the hybrid vehicle, fuel supply is stopped, and when a driving force is transmitted to the motor M side from the front wheels Wf, the motor M functions as a generator depending on the deceleration conditions, to generate what is called regenerative braking, and the kinetic energy of the vehicle is recovered as electrical energy. There rear wheels are designated as Wr. Note that, in FIG. 1, parts associated with both a manual transmission vehicle and a CVT vehicle are described together for convenience of description.

The drive of the motor M and regenerative braking of the motor M are controlled by a power drive unit 2, receiving control instructions from a motor ECU 1. A battery 3 of a high-tension system for transferring electrical energy to and from the motor M is connected to the power drive unit 2. The battery 3 is constructed from individual modules wherein, for example, a plurality of cells is connected in series, with a plurality of these modules connected in series. A 12 volt auxiliary battery 4 is mounted on a hybrid vehicle for driving various auxiliary machines. This auxiliary battery 4 is connected to the battery 3 through a downverter (down converter) 5, which corresponds to a DC-DC converter. The downverter 5 is controlled by a FIECU 11, and reduces the voltage of the battery 3 to charge the auxiliary battery 4.

Note that the motor ECU 1 not only protects the battery 3, but also provide a battery CPU 1B for calculating the state of charge of the battery SOC. Furthermore, the CVT, that is, the transmission T is connected with a CVTECU 21 for controlling the transmission T.

The FIECU 11, in addition to the motor ECU 1 and the down converter 5, controls the operation of a fuel injection valve 75 for controlling the amount of fuel supplied to the engine E, the operation of a starter motor 7, and also the ignition timing. Therefore, the FIECU 11 receives various inputs such as a signal from a speed sensor S1 for detecting the vehicle speed, a signal from a rotation speed sensor S2 for detecting the engine rotation speed NE, a signal from a shift position sensor S3 for detecting the shift position of the transmission T, a signal from a brake switch S4 for detecting the operation of a brake pedal 8, a signal from a clutch switch S5 for detecting the operation of a clutch pedal 9, a signal from a throttle opening sensor S6 for measuring throttle opening TH, and a signal from an inlet pipe negative pressure sensor S7 for detecting inlet pipe negative pressure PBGA.

BS denotes a brake servo connected to a brake pedal, and a brake master power internal negative pressure sensor S9 for detecting the brake master power internal negative pressure (referred to hereunder as master power internal negative pressure) is installed in this brake servo BS. This master power internal negative pressure sensor S9 is connected to the FIECU 11.

The inlet pipe negative pressure sensor S7 and the degree of throttle opening sensor S6 are installed in an inlet path 30, and the master power internal negative pressure sensor S9 is installed in a communication path 31 connected to the inlet path 30.

Note that the inlet path 30 is provided with a second air path 33, which connects the upstream side and the downstream side of a throttle valve 32 and the second air path 33 is provided with a control valve 34 capable of opening and closing the second air path 33. The second air path 33 is used for supplying a small amount of air into the cylinders even when the throttle valve 32 is completely closed. The control valve 34 is operated to open and close by a signal from the FIECU 11 depending on the inlet pipe negative pressure detected by the inlet pipe negative pressure sensor S7.

Furthermore, a POIL sensor S10, a solenoid of a spool valve 71, and a TOIL sensor S11, which are mentioned later, are also connected to the FIECU 11.

The engine E has three cylinders each incorporating variable valve timing mechanisms VT on its intake side and exhaust side for cylinder deactivation operation, and the engine also has a cylinder, which does not perform deactivation operation, incorporating a normal valve operating mechanism NT. The engine E is a cylinder deactivation engine that is capable of performing deactivation by switching between the all cylinders operation for operating all cylinders (four cylinders), and the cylinder deactivation operation for stopping three cylinders, which performs a cylinder deactivation operation depending on at least the deceleration state of a vehicle for reducing pumping losses, and increasing the regeneration amount recoverable by the motor M to improve regeneration efficiency. The intake valve and exhaust valve of each cylinder that is capable of deactivation are constructed such that operation can be deactivated by the variable valve timing mechanism VT, that is the intake and exhaust paths can be closed.

Reference numeral 70 denotes an oil pump, and reference numeral 71 denotes a spool valve. The oil pump 70 and the spool valve 71 supply oil pressure to the variable valve timing mechanisms VT. The spool valve 71 is connected to the discharge side of the oil pump 70. Oil pressure from the oil pump 70 operates on a cylinder deactivation side path 72 and a cylinder deactivation cancellation side path 73 of the spool valve 71. As a result, each variable valve timing mechanism VT operates and switches between the cylinders in deactivation operation and all cylinder activation operation. The POIL sensor S10 is connected to the cylinder deactivation cancellation side path 73. The POIL sensor S10 monitors the oil pressure of the cylinder deactivation cancellation side path 73, which is low at the time of cylinder deactivation, and high at the time of normal operation.

Each cylinder is provided with a fuel injection valve 75, and the cylinders with a variable valve timing mechanism VT are each provided with a knock sensor S8 connected to the FIECU 11, which can detect the firing state of each cylinder. Furthermore, the TOIL sensor S11 which detects oil temperature, is installed in a supply path 74 on the discharge side of the oil pump 70 that branches from the path to the spool valve 71 and supplies working oil to the engine E, and monitors the temperature of the working oil supplied.

Zoning of State of Charge of the Battery SOC

Next, zoning of the state of charge of the battery SOC (so-called zone division of state of charge) is described. The state of charge of the battery is calculated in a battery CPU 1B, based on, for example, from voltage, discharge current, temperature and the like.

To give an example, using a normal use zone zone A (from SOC 40% to SOC 75%) as a base, a temporary use zone zone B (from SOC 25% to SOC 40%) is positioned below the zone A, and an over discharge zone zone C (from SOC 0% to SOC 25%) is positioned further below. Above zone A is defined as an overcharge zone zone D (from SOC 75% or higher).

Note that the boundary region between zone A, being a normal use zone, and zone B, being a temporary use zone, forms a first threshold, and the boundary region between zone B and zone C, being an over discharge zone, forms a second threshold.

MA (Motor) Basic Modes

Figure 2:
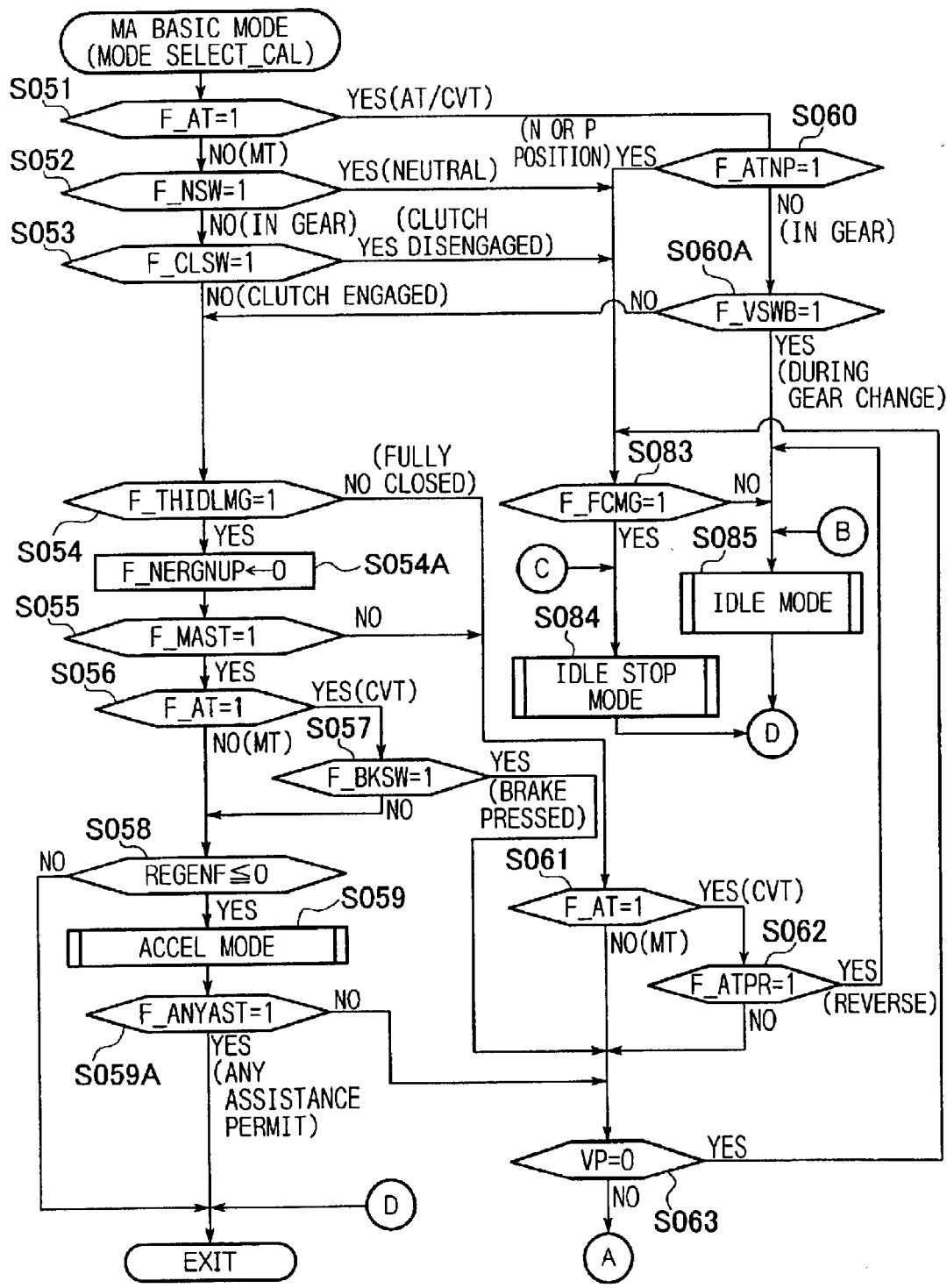
FIG. 2 is a flowchart showing an MA basic mode according to an embodiment of the present invention.
Figure 3:
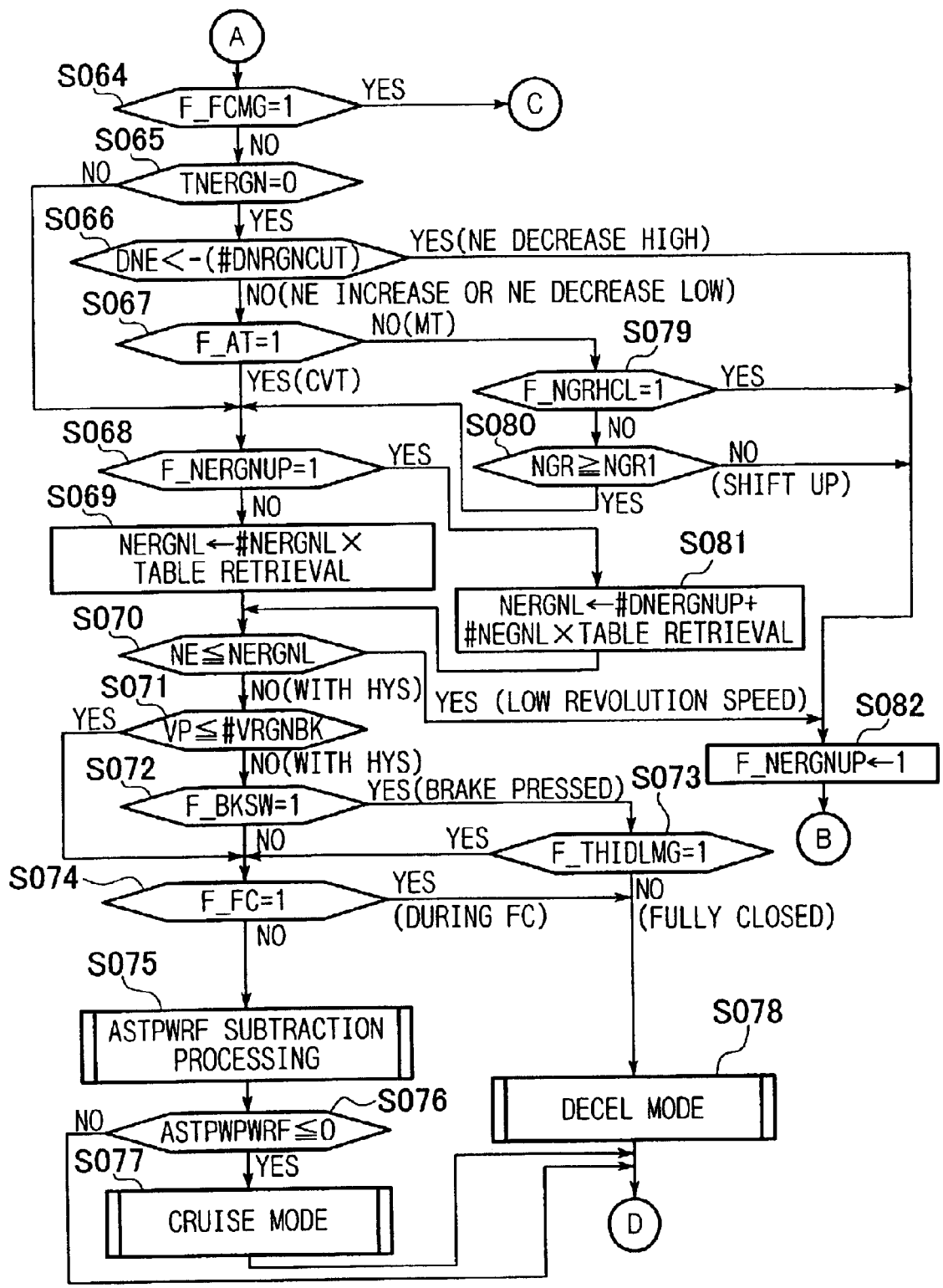
FIG. 3 is a flowchart showing the MA basic mode according to an embodiment of the present invention.

Next is a description of the MA (motor) basic modes, which define the modes in which the motor M operates, based on the flow charts shown in FIG. 2 and FIG. 3.

This processing is repeated at a predetermined cycle time.

The MA (motor) basic modes include "idle mode", "idle stop mode", "deceleration mode", "cruise mode" and "acceleration mode". In the idle mode, fuel supply is resumed after fuel supply cut, to maintain the engine E in an idle condition, and in the idle stop mode, for example at the time the vehicle is stopped, the engine is stopped at a predetermined condition. Furthermore, in the deceleration mode, regenerative braking by the motor M is performed. In the acceleration mode, the engine E is drive assisted by the motor M, and in the cruise mode, the motor M is not driven so that the vehicle runs under the driving force of the engine E.

In the embodiment, hybrid vehicles are assumed to be a continuously variable transmission ("CVT") vehicle, but a manual transmission ("MT") vehicle can be included in the explanation for the specification of the present MT vehicle can be included in the category of the CVT vehicle.

In step S051 of FIG. 2, it is determined whether an MT/CVT determination flag F_AT is "1. When the determination is "YES" (a CVT vehicle), the flow proceeds to step S060. When the determination is "NO" (an MT vehicle), the flow proceeds to step S052.

In step S060, it is determined whether an in gear determination flag for CVT vehicle F_ATNP is "1". When the determination is "YES" (N or P position), the flow proceeds to step S083, and when the determination is "NO" (in gear), the flow proceeds to step S060A.

In step S060A, it is determined whether the gear shift is being operated (shift position cannot be determined due to the gear shift being operated) by determining whether a switch back flag F_VSWB is "1". When the determination is "YES" (being switch back), the flow proceeds to S085, and the control shifts to "idle mode", and the flow complete. In the idle mode, the engine E is maintained in an idle state. In the case when the determination of step S060A is "NO" (not being switched back), the flow proceeds to step S053A.

In step S083, it is determined whether an engine stop control execution flag F_FCMG is "1". When the determination of step S083 is "NO", control shifts to "idle mode" in step S085, and the flow terminate. When the determination of step S083 is "YES", the flow proceeds to step S084, and the control shifts to "idle stop mode", and the flow terminates. In the idle stop mode, for example at the time the vehicle is stopped, the engine is stopped when a defined state is satisfied.

In step S052, it is determined whether a neutral position determination flag F_NSW is "1". When the determination is "YES" (neutral position), the flow proceeds to step S083, and when the determination is "NO" (in gear), the flow proceeds to step S053.

In step S053, it is determined whether a clutch engagement determination flag F_CLSW is "1". When the determination is "YES" (clutch is disengaged), the flow proceeds to step S083, and when the determination is "NO" (clutch is engaged), the flow proceeds to step S053A.

In step S054, it is determined whether an idle determination flag F_THIDLMG is "1". When the determination is "NO" (fully closed), the flow proceeds to step S061, and when the determination is "YES" (not fully closed), the flow proceeds to step S054A.

In step S054A, an engine rotation speed increase flag F_NERGNUP at the time of partially engaged clutch determination is set to "0", and the flow proceeds to step S055.

In step S055, it is determined whether a motor assist determination flag F_MAST is "1". This flag is used to determine whether the engine is to be assisted by the motor M. When the determination is "1", it means that the motor assist is required, and when the determination is "0", it means that the motor assist is not required. This motor assist determination flag is determined and set by motor assist trigger determination processing.

When the determination in step S055 is "NO", the flow proceeds to step S061. When the determination in step S055 is "YES", the flow proceeds to step S056.

In step S056, it is determined whether the MT/CVT determination flag F_AT is "1". When the determination is "YES" (a CVT vehicle), the flow proceeds to step S057, and when the determination is "NO" (an MT vehicle), the flow proceeds to step S058.

In step S057, it is determined whether a brake ON determination flag F_BKSW is "1". When the determination is "YES" (brake ON), the flow proceeds to S063, and when the determination is "NO" (brake off), the flow proceeds to step S057A.

In step S058, it is determined whether the final charge instruction value REGENF is less than or equal to "0". When the determination is "YES", the flow proceeds to "acceleration mode" in step S059. In acceleration mode, the engine E is drive assisted by the motor M, and the flow proceeds to step S059A. When the determination of step S058 is "NO", the control flow terminates.

In step S059A, it is determined whether an assist permit flag F_ACCAST is "1" or not. When the determination is "YES", control terminates, and When the determination is "NO", the flow proceeds to step S059B.

In step S061, it is determined whether the MT/CVT determination flag F_AT is "1". When the determination is "NO" (an MT vehicle), the flow proceeds to step S063, and when the determination is "YES" (a CVT vehicle), the flow proceeds to step S062.

In step S062, it is determined whether a reverse position determination flag F_ATPR is "1". When the determination is "YES" (reverse position), the flow proceeds to step S085, and when the determination is "NO" (position other than reverse), the flow proceeds to step S063.

In step S063, it is determined whether a vehicle speed VP is "1". When the determination is "YES", the flow proceeds to step S083, and when the determination is "NO", the flow proceeds to step S064.

In step S064, it is determined whether the engine stop control execution flag F_FCMG is "1". When the determination is "NO", the flow proceeds to step S065, and when the determination is "YES", the flow proceeds to step S084.

In step S065, it is determined whether a shift change forced REGEN cancellation determination processing delay timer TNERGN is "1". When the determination is "YES", the flow proceeds to step S066, and when the determination is "NO", the flow proceeds to step S068.

In step S066, it is determined whether the rate of change of engine rotation speed DNE is less than the negative value of a REGEN cut determination engine rotation speed #DNRGNCUT by DNE. Note that the REGEN cut determination engine rotation speed #DNRGNCUT by DNE is the rate of change DNE of engine rotation speed NE which constitutes a reference for determining whether the generation amount is to be subtracted, depending on the rate of change of engine rotation speed DNE.

When the determination of step S066 is that the decrease (rate of fall) of the engine rotation speed NE is high (YES), the flow proceeds to step S082. In step S082, the engine rotation speed increase flag F_NERGNUP at the time of partially engaged clutch determination is set to "1", and the flow proceeds to step S085.

When the determination in step S066 is that the engine rotation speed NE rises (increasing), or falling rate (rate of fall) of the engine rotation speed NE is low (NO), the flow proceeds to step S067.

In step S067, it is determined whether the MT/CVT flag F_AT is "1" When the determination is "NO" (an MT vehicle), the flow proceeds to step S079. When the determination is "YES" (a CVT vehicle), the flow proceeds to step S068.

In step S079, it is determined whether a partially engaged clutch determination flag F_NGRHCL is "1". When the determination is that the clutch is partially engaged (YES), the flow proceeds to step S082. Furthermore, when it is determined that the clutch is not determined to be partially engaged (NO), the flow proceeds to step S080.

In step S080, the previous gear position NGR and the present gear position NGRI are compared, and it is determined whether there has been a shift up by comparison between the present and previous gear positions.

When the determination of step S080 is that the gear position has been shifted up (NO), the flow proceeds to step S082. When the determination of step S080 is that the gear position has not been shifted up from the previous time (YES), the flow proceeds to step S068.

In step S068, it is determined whether the engine rotation speed increase flag F_NERGNUP for at the time that the partially engaged clutch determination is "1". When the determination is "YES" indicating that an increase in engine rotation speed is required at the time of partially engaged clutch determination and the flag is set (=1), the flow proceeds to step S081, wherein a revolution speed increase #DNERGNUP for preventing hunting is added to the charging engine rotation speed lower limit value #NERGNLx, and the added value is set to the charge engine rotation speed lower limit value NERGNL, and the flow proceeds to step S070.

When the determination of step S068 is that an increase in engine rotation speed is not required at the time of partially engaged clutch determination, and it is determined (NO) that the flag is reset (=0), the flow proceeds to step S069, wherein the charging engine rotation speed lower limit value #NERGNLx, which is set for each gear, is set to the charge engine rotation speed lower limit value NERGNL, and the flow proceeds to step S070.

Then, in step S070 it is determined whether the engine rotation speed NE is less than or equal to the charge engine rotation speed lower limit value NERGNL. When the determination is that the rotation speed is low (NE≦NERGNL, yes), the flow proceeds to step S082. When the determination is that the rotation speed is high (NE>NERGNL, NO), the flow proceeds to step S071.

In step S071, it is determined whether the vehicle speed VP is less than or equal to the deceleration mode brake determination lower vehicle speed limit #VRGNBK. Note that this deceleration mode brake determination lower vehicle speed limit #VRGNBK is a value with hysteresis. When the determination is that the vehicle speed VP≦the deceleration mode brake determination lower vehicle speed limit #VRGNBK (yes), the flow proceeds to step S074. When the determination in step S071 is that the vehicle speed VP>the deceleration mode brake determination lower vehicle speed limit #VRGNBK (NO), the flow proceeds to step S072.

In step S072, it is determined whether a brake ON determination flag F_BKSW is "1". When the determination is "YES", the flow proceeds to step S073, and when the determination is "NO", the flow proceeds to step S074.

In step S073, it is determined whether an idle determination flag F_THIDLMG is "1". When the determination is "NO" (throttle is fully closed), the flow proceeds to "deceleration mode" in step S078, and the control flow terminates. Note that, in the "deceleration mode", regenerative braking is performed by the motor M. When the determination in step S073 is "YES", the flow proceeds to step S074.

In step S074, it is determined whether a fuel supply cut flag F_FC is "1". This flag is a fuel supply cut determination flag, which turns to "1" when regeneration by the motor M is performed in the "deceleration mode" in step S078, and cuts the fuel. If the result of the determination in step S074 is that deceleration fuel supply cut is in effect (YES), the flow proceeds to step S078. If the result of the determination in step S074 is that fuel supply cut is not in effect (NO), the flow proceeds to step S075.

In step S075, the final assist instruction value ASTPWRF is subtracted, and the flow then proceeds to step S076.

In step S076, it is determined whether the final assist instruction value ASTPWRF is less than or equal to "0". When the determination is "YES", the control flow shifts to "cruise mode" in step S077, and terminates. In cruise mode the motor M is not driven and the vehicle travels under the driving force of the engine E. Furthermore, the battery 3 may be charged by regenerative operation of the motor M or by using the motor as a generator depending on the running conditions of the vehicle.

When the determination of step S076 is "NO", control terminates.

Acceleration Mode

Hereinafter, an explanation with reference to the attached figures is described about processing of the acceleration mode in the aforementioned step S059, which is a process for comparing the range of assist amount and selecting/outputting an optimum mode. Note that the acceleration mode mainly involves the motor assist (ECO assist, step S320) when the engine output is in a low load state, and the motor assist (WOT assist, step S322) when the engine output is in a high load state.

Figure 4:
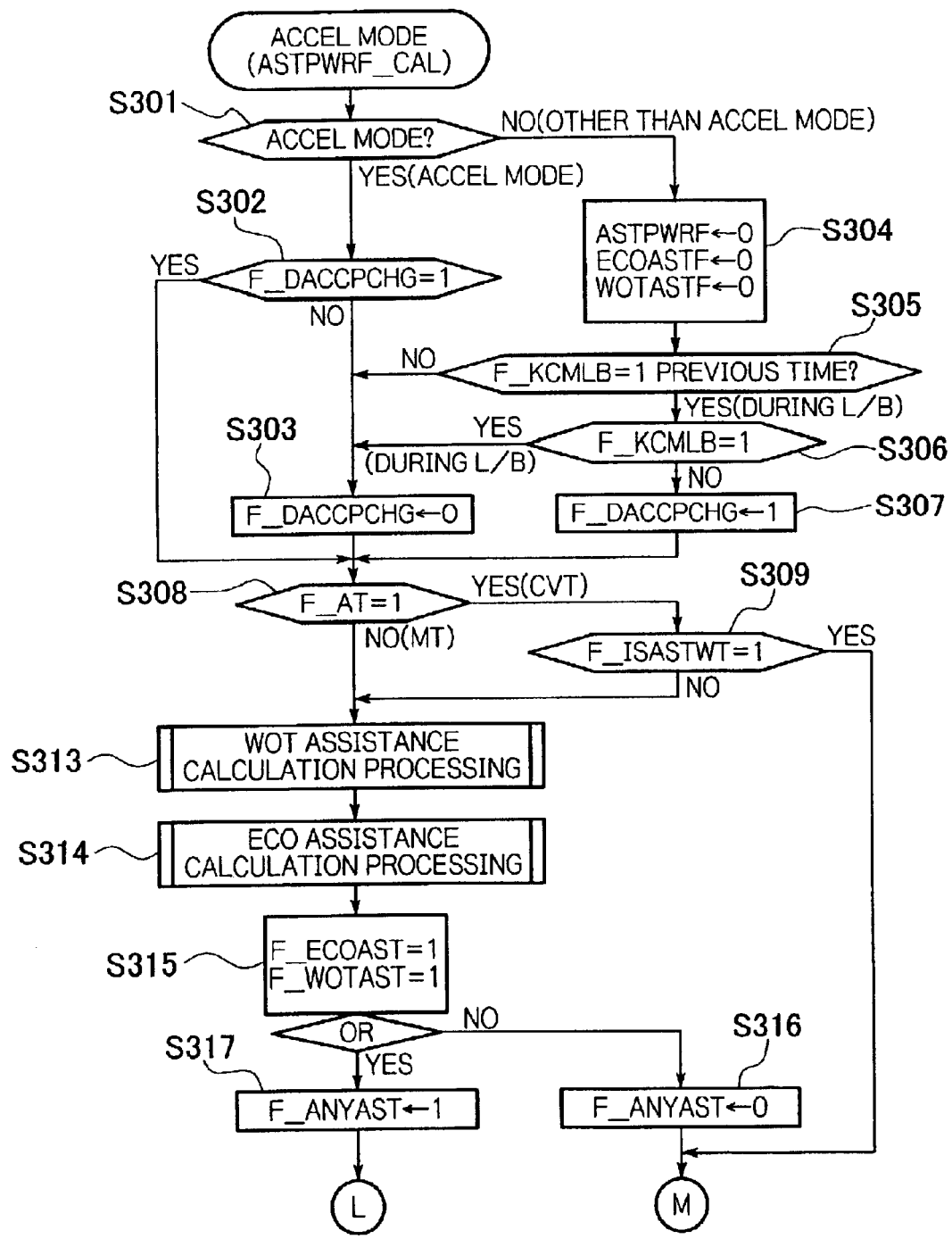
FIG. 4 is a flow chart showing an acceleration mode according to an embodiment of the present invention.
Figure 5:
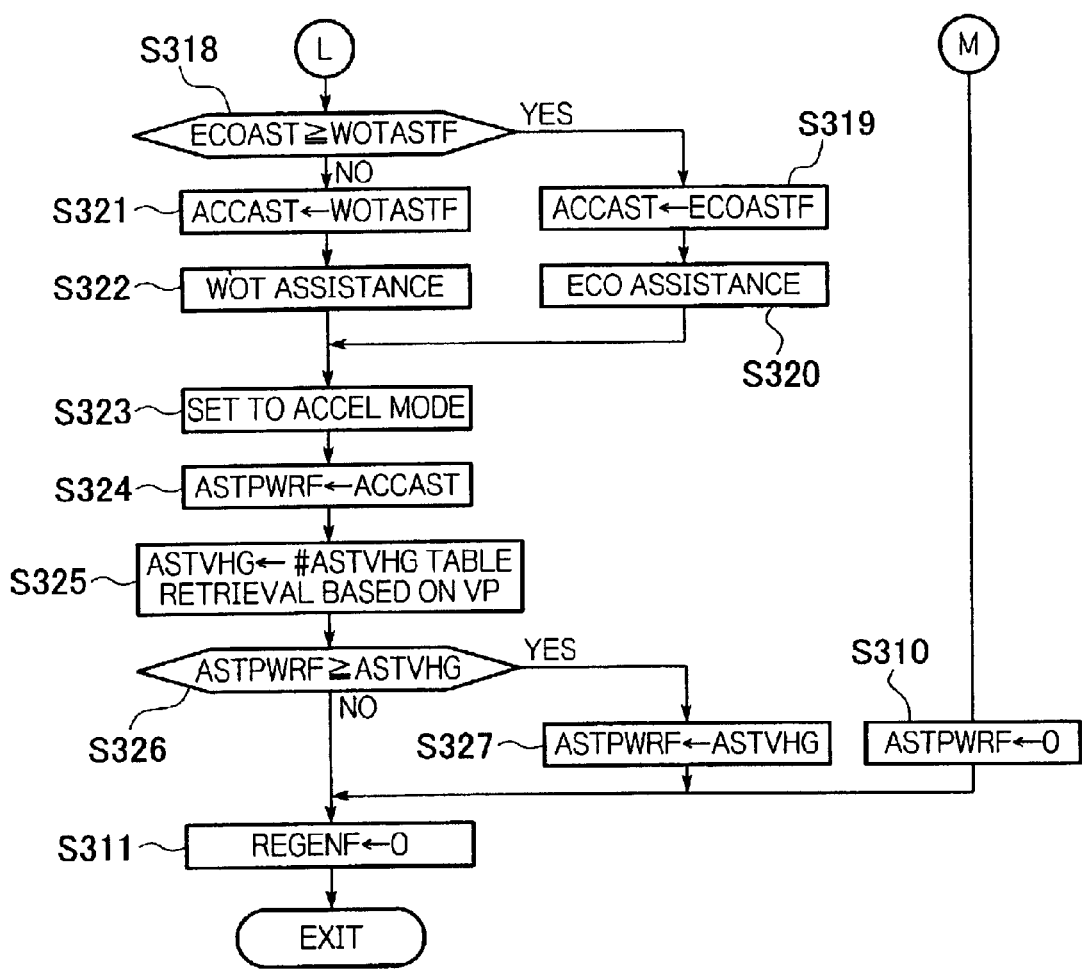
FIG. 5 is a flow chart showing the acceleration mode according to an embodiment of the present invention.

FIG. 4 and FIG. 5 are flow charts showing the acceleration mode process.

First, in step S301 of FIG. 4, it is determined whether it is acceleration mode in which the engine E is assisted.

When the determination is "YES", that is, when the vehicle is in the acceleration mode wherein the engine is assisted by the motor, the flow proceeds to step S302. On the other hand, when the determination is "NO", that is, when the vehicle is not in the acceleration mode which does not require the motor assist, the flow proceeds to step S304 as mentioned later.

In step S302 it is determined whether the air-fuel ratio switching time assist establishment recognition flag F_DACCPCHG, which prevents the driver from feeling a sudden change of the engine output when the motor assist is established by switching from stoichiometric to lean burn, is "1".

When the determination is "YES", the flow proceeds to step S308 as mentioned later.

On the other hand, when the determination is "NO", the flow proceeds to step S303, wherein the air-fuel ratio switching time assist establishment recognition flag F_DACCPCHG is set to "0", and the flow proceeds to step S308.

Furthermore, in step S304 a final assist instruction value ASTPWRF, a final ECO assist instruction value ECOASTF and a final WOT assist instruction value WOTASTF, are set to "0".

In step S305, it is determined whether the lean burn determination flag F_KCMLB has been "1" in the previous processing.

When the determination is "YES", that is, when it is determined that the combustion is carried out under the lean burn condition, the flow proceeds to step S306.

In step S306, it is determined whether the lean burn determination flag F_KCMLB is "1" or not.

When the determination is "YES", that is, when the combustion under the lean burn condition is maintained, the flow proceeds to the above-described step S303.

On the other hand, when the determination is "NO", that is, when the lean burn condition is switched to the stoichiometric condition, the flow proceeds to step S307, wherein the air-fuel ratio switching time assist establishment recognition flag F_DACCPCHG is set to "1", and the flow proceeds to step S308.

In step S308 it is determined whether the flag setting of an MT/CVT determination flag F_AT is "1".

When the determination is "YES", the flow proceeds to step S309, wherein it is determined whether the flag F_ISASTWT for requesting the motor assist waiting state from idle stop to start time, is "1".

When the determination of step S309 is "YES", the flow proceeds to step S310, the final assist instruction value ASTPWRF is set to "0", the flow proceeds to step S311, wherein the final charge instruction value REGENF is set to "0", and the flow terminates.

On the other hand, when the determination of step S308 is "NO" (MT vehicle), or when the determination in step S309 is "NO", the flow proceeds to step S313.

Next, in step S313, a WOT assist calculation process is executed, and the final WOT assist instruction value WOTASTF is calculated.

In step S314, an ECO assist calculation process is executed, and the ECO assist instruction value ECOAST and the final ECO assist instruction value ECOASTF are calculated.

In step S315, it is determined whether the WOT assist flag F_WOTAST for instructing execution of the motor assist at the time of WOT (wide open high load state) or the ECO assist flag F_ECOAST for instructing execution of the motor assist at a low load state are "1".

When the determination is "NO", the flow proceeds to step S316 as mentioned later, wherein either one assist execution permission flag F_ANYAST for permitting execution of any motor assist is set to "0", and the flow proceeds to step S310 as mentioned above.

On the other hand, when the determination is "YES", the flow proceeds to step S317, wherein, either the assist execution permission flag F_ANYAST for permitting execution of any motor assist is set to "1", and the flow proceeds to step S318.

In step S318, it is determined whether the ECO assist instruction value ECOAST is greater than or equal to the final WOT assist instruction value WOTASTF.

When the determination in step S318 is "YES", the flow proceeds to step S319, wherein the ECO assist instruction value ECOAST is set to a normal assist instruction value ACCAST in acceleration mode, and the flow proceeds to step S320, wherein it is determined that the vehicle state is in the ECO assist state where the engine E is in a low load state, and the flow proceeds to step S323 as mentioned later.

On the other hand, when the determination is "NO", the flow proceeds to step S321, wherein the final WOT assist instruction value WOTASTF is set to the normal assist instruction value ACCAST, and the flow proceeds to step S322, wherein it is determined that the vehicle state is the WOT assist state where the engine E is in the WOT (wide open high load) control state, and the flow proceeds to step S323 as mentioned later.

In step S323, the system state is set to acceleration mode.

Then, in step S324, the normal assist instruction value ACCAST is set as the final assist instruction value ASTPWRF.

In the next step S325, an assist amount upper limit value ASTVHG, which changes depending on vehicle speed VP, is obtained by the table retrieval.

Then in step S326, it is determined whether the final assist instruction value ASTPWRF is greater than or equal to the assist amount upper limit value ASTVHG.

When the determination is "NO", the flow proceeds to step S311 described above.

On the other hand, when the determination is "YES", the flow proceeds to step S327, wherein the assist amount upper limit value ASTVHG is set as the final assist instruction value ASTPWRF, and the flow proceeds to step S311.

ECO Assist Calculation Process

Incidentally, if a cylinder is not deactivated because of an abnormality in the cylinder deactivation engine, because of failure of the variable valve timing mechanism VT, then air flows through the intake and exhaust paths similar to the normal time, so engine friction is not reduced and hence the regeneration amount is reduced by an amount corresponding to the cylinder friction. Accordingly, if control is performed in the acceleration mode with a reduced assist amount preset by reducing the amount corresponding to the amount of engine friction, the battery 3 tends to be further discharged. However, if the motor assist in acceleration mode is designed previously to be stopped completely when a variable valve timing mechanism VT fails, then the merit of the deactivation cylinder engine is lost.

Therefore, during ECO assist in a low load state in which the driver's acceleration intention is comparatively low in comparison with WOT assist in a high load state in which a driver's acceleration intention is high, since the assist amount is limited even when the variable valve timing mechanism VT fails, the present invention attempts to satisfy the driver's acceleration intention with no adverse influence on energy management, and without any unpleasant sensation.

Hereunder is a description of the ECO assist calculation process in the abovementioned step S314, that is, the process for calculating the assist amount in a low engine load state, with reference to the attached figures.

Figure 6:
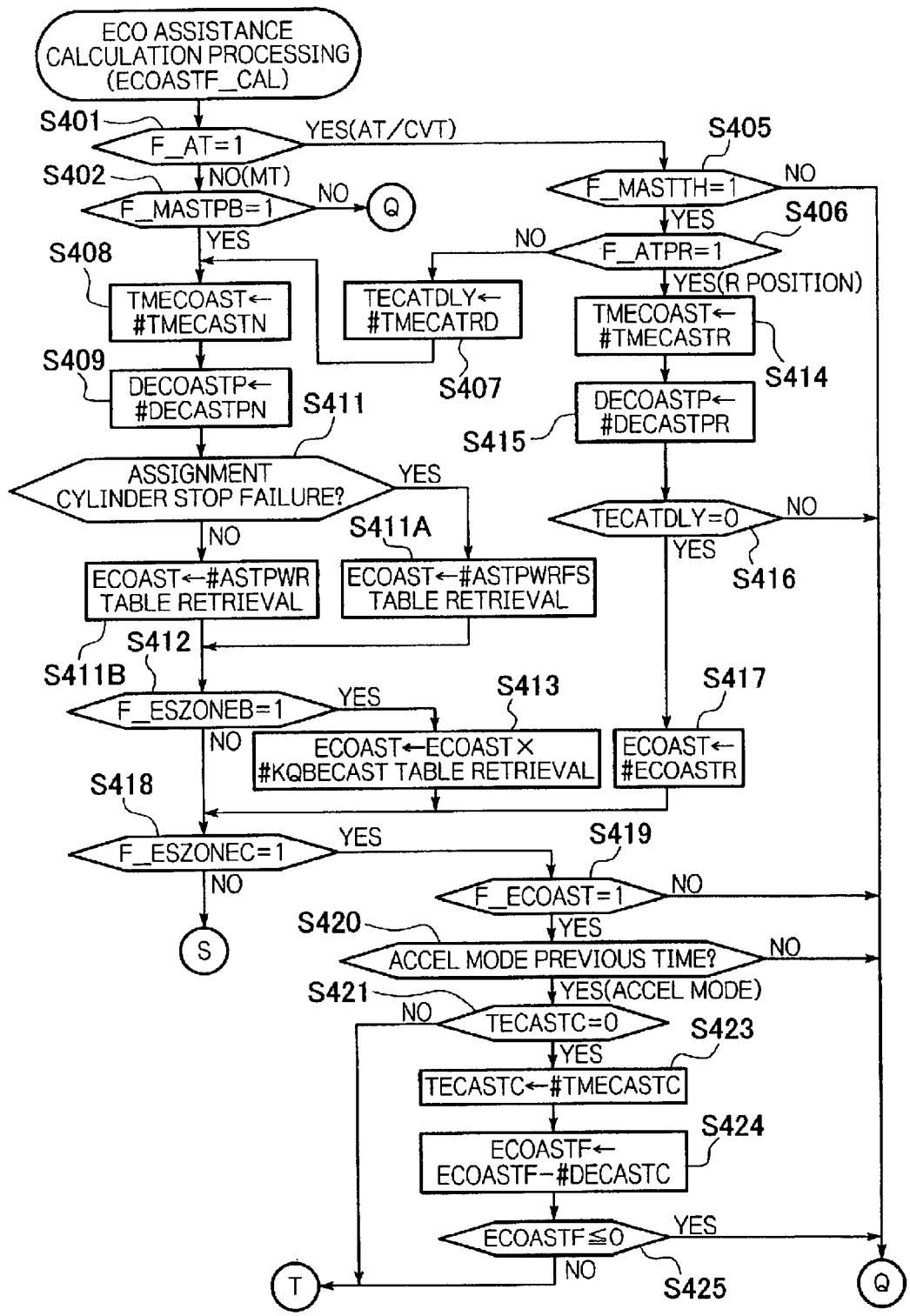
FIG. 6 is a flow chart showing an ECO assist calculation process according to the embodiment of the present invention.
Figure 7:
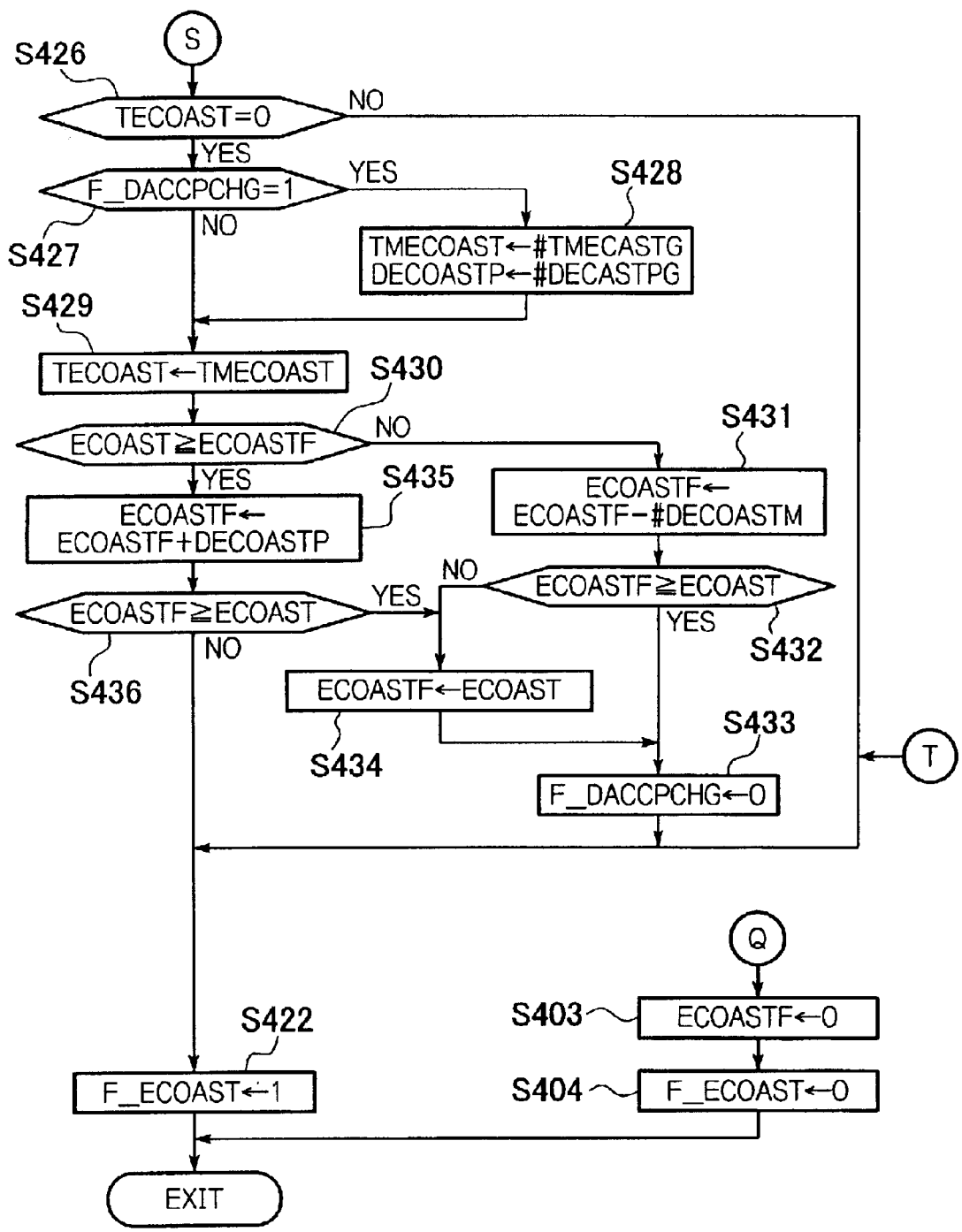
FIG. 7 is a flow chart showing the ECO assist calculation process according to the embodiment of the present invention.

FIG. 6 and FIG. 7 are flow charts showing the ECO assist calculation process.

First, in step S401 of FIG. 6, it is determined whether the MT/CVT determination flag F_AT is "1". When the determination is "YES" (CVT vehicle), the flow proceeds to step S405 as mentioned later.

On the other hand, when the determination is "NO" (MT vehicle), the flow proceeds to step S402, wherein it is determined whether the inlet pipe negative pressure motor assist determination flag F_MASTPB is "1".

Note that the inlet pipe negative pressure motor assist determination flag F_MASTPB is a flag which becomes "1" when the inlet pipe negative pressure exceeds a predetermined threshold, and permits ECO assist (step S422).

When the determination of step S402 is "YES", the flow proceeds to step S408, as described later.

On the other hand, when the determination of step S402 is "NO", the flow proceeds to step S403, wherein the final ECO assist instruction value ECOASTF is set to "0", and the flow proceeds to step S404. Then, in step S404, the ECO assist flag F_ECOAST is set to "0", and this control flow terminates.

Furthermore, in step S405 it is determined whether the motor assist throttle determination flag F_MASTTH is "1".

Note that the motor assist throttle determination flag F_MASTTH is a flag which becomes "1" when the throttle opening exceeds a predetermined threshold, and permits ECO assist (step S422).

When the determination is "NO", the flow proceeds to step S403 mentioned above.

On the other hand, when the determination is "YES", the flow proceeds to step S406, and it is determined whether the reverse position determination flag F_ATPR is "1".

When the determination of step S406 is "YES" (reverse position), the flow proceeds to step S414 as mentioned later.

On the other hand, when the determination of step S406 is "NO" (other than reverse position), the flow proceeds to step S407.

In step S407, the R range assist permission delay timer TECATDLY is set to a predetermined R range assist permission delay #TMECATRD, and the flow proceeds to step S408.

Next, in step S408, a predetermined gradual incremental updating timer #TMECASTN is set to a subtraction timer TMECOAST, the flow proceeds to step S409, wherein a final ECO assist instruction value gradual incremental term DECOASTP is set to a predetermined gradual incremental term #DECASTPN, and the flow proceeds to step S411.

In step S411, it is determined whether the assigned cylinder deactivation is failed. When the determination is "YES", the flow proceeds to step S411A, and when the determination is "NO", the flow proceeds to step S411B.

In step S114A, the cylinder deactivation failure time assist amount #ASTPWRFS, which is determined by the table retrieval of to the engine rotation speed and the inlet pipe negative pressure, is set to the ECO assist instruction value ECOAST, and the flow proceeds to step S412. Note that this cylinder deactivation failure time assist amount #ASTPWRFS is an assist amount that is limited (for example 70% or 80%) in comparison with that at the normal time. This cylinder deactivation failure time assist amount #ASTPWRFS is different for an MT vehicle and a CVT vehicle.

In step S411B, the assist amount #ASTPWR when cylinder deactivation operation is normal is table retrieved, which is set to the ECO assist instruction value ECOAST, and the flow proceeds to step S412. This assist amount #ASTPWR is also different for an MT vehicle and a CVT vehicle.

Note that when the assigned deactivation cylinder is failed in step S411 means an abnormality in the cylinder deactivation engine, that is, when the variable valve timing mechanism VT for a deactivating cylinder or the spool valve 71 fail for some reason, and the corresponding intake and exhaust valves do not close the intake and exhaust paths. As mentioned later, abnormality determination at the time of the deactivation cylinder failure can be detected by monitoring a signal from the aforementioned knock sensor S8. In addition, when a valve timing mechanism VT fails as described above, fuel supply to the failed cylinder is stopped.

In the next step S412, it is determined whether the energy storage zone B flag F_ESZONEB is "1".

When the determination is "YES", that is, when it is determined that the state of charge of the battery SOC is in zone B, the flow proceeds to step S413. On the other hand, when the determination is "NO", the flow proceeds to step S418 as mentioned later.

In step S413, an ECO assist amount coefficient is obtained by a table retrieval as a map value #KQBECAST according to the state of charge of the battery SOC. Then, a value obtained by multiplying the ECO assist instruction value ECOAST and the ECO assist amount coefficient table value #KQBECAST is set as a new ECO assist instruction value ECOAST, and the flow proceeds to step S418. The table value #KQBECAST, being the ECO assist amount coefficient, is a coefficient that increases as the state of charge of the battery increases. That is, the higher the state of charge of the battery, the higher assist amount is set.

Furthermore, in step S414, the subtraction timer TMECOAST is set to a predetermined incremental updating timer #TMECASTR, the flow proceeds to step S415, the final ECO assist instruction incremental term DECOASTP is set to a predetermined incremental term #DECASTPR, and the flow proceeds to step S416.

In step S416, it is determined whether the R range assist permission delay timer TECATDLY is "0".

When the determination is "NO", the flow proceeds to step S403.

On the other hand, when the determination is "YES", the flow proceeds to step S417, wherein the ECO assist instruction value ECOAST is set to a predetermined R range assist amount #ECOASTR, and the flow proceeds to step S418.

In step S418, it is determined whether the energy storage zone C flag F_ESZONEC is "1".

When the determination is "YES", that, when it is determined that the state of charge of the battery SOC is in zone C, the flow proceeds to step S419. On the other hand, when the determination is "NO", the flow proceeds to step S426 as mentioned later.

In step S419, it is determined whether the ECO assist flag F_ECOAST is "1". When the determination is "NO", the flow proceeds to step S403 mentioned above.

On the other hand, when the determination is "YES", the flow proceeds to step S420, and it is determined whether the previous process was in acceleration mode to assist the engine E. When the determination of step S420 is "NO", the flow proceeds to step S403 mentioned above. On the other hand, when the determination of step S420 is "YES", that is, the previous process was in acceleration mode to assist the engine E, the flow proceeds to step S421.

In step S421, it is determined whether the subtraction timer TECASTC is "0".

When the determination is "NO", the flow proceeds to step S422, wherein the ECO assist flag F_ECOAST is set to "1", and the flow terminates. On the other hand, when the determination is "YES", the flow proceeds to step S423, wherein the subtraction timer TECASTC is set to a predetermined gradual decremental updating timer #TMECASTC, and the flow proceeds to step S424.

In step S424, a value obtained by subtracting a predetermined gradual decremental term #DECASTC from the final ECO assist instruction value ECOASTF is set as a new final ECO assist instruction value ECOASTF.

In step S425, it is determined whether the final ECO assist instruction value ECOASTF is less than or equal to "0".

When the determination is "YES", the flow proceeds to step S403 mentioned above. On the other hand, when the determination is "NO", the flow proceeds to step S422 mentioned above.

Furthermore, in step S426, it is determined whether the ECO assist instruction subtraction timer TECOAST is "0".

When the determination is "NO", the flow proceeds to step S422 mentioned above.

On the other hand, when the determination is "YES", the flow proceeds to step S427, wherein it is determined whether the air-fuel ratio switching time assist establishment recognition flag F_DACCPCHG is "1".

When the determination in step S427 is "YES", the flow proceeds to step S428, wherein the subtraction timer TMECOAST is set to a predetermined gradual incremental updating timer #TMECASTG, and the final ECO assist gradual instruction incremental term DECOASTP is set to a predetermined gradual incremental term #DECASTPG, and the flow proceeds to step S429.

On the other hand, when the determination of step S427 is "NO", the flow proceeds to step S429.

In step S429, the ECO assist instruction subtraction timer TECOAST is set to the subtraction timer TMECOAST, the flow proceeds to step S430, wherein it is determined whether the ECO assist instruction value ECOAST is greater than or equal to the final ECO assist instruction value ECOASTF.

When the determination is "YES", the flow proceeds to step S435 as mentioned later.

On the other hand, when the determination is "NO", the flow proceeds to step S431, wherein a value obtained by subtracting a predetermined gradual decremental term #DECOASTM from the final ECO assist instruction value ECOASTF is set as a new final ECO assist instruction value ECOASTF.

Next, in step S432, it is determined whether the final ECO assist instruction value ECOASTF is greater than or equal to the ECO assist instruction value ECOAST.

When the determination is "YES", the flow proceeds to step S433, the air-fuel ratio switching time assist establishment recognition flag F_DACCPCHG is set to "0", and the flow proceeds to step S422 mentioned above.

On the other hand, when the determination is "NO", the flow proceeds to step S434, the final ECO assist instruction value ECOASTF is set to the ECO assist instruction value ECOAST, and the flow proceeds to step S433 as mentioned above.

Furthermore, in step S435, a value obtained by adding the final ECO assist instruction value gradual incremental term DECOASTP to the final ECO assist instruction value ECOAST is set as a new final ECO assist instruction value ECOASTF.

In step S436, it is determined whether the final ECO assist instruction value ECOASTF is greater than or equal to the ECO assist instruction value ECOAST.

When the determination is "YES", the flow proceeds to step S434 as mentioned above. On the other hand, when the determination is "NO", the flow proceeds to step S432 as mentioned above.

Figure 8:
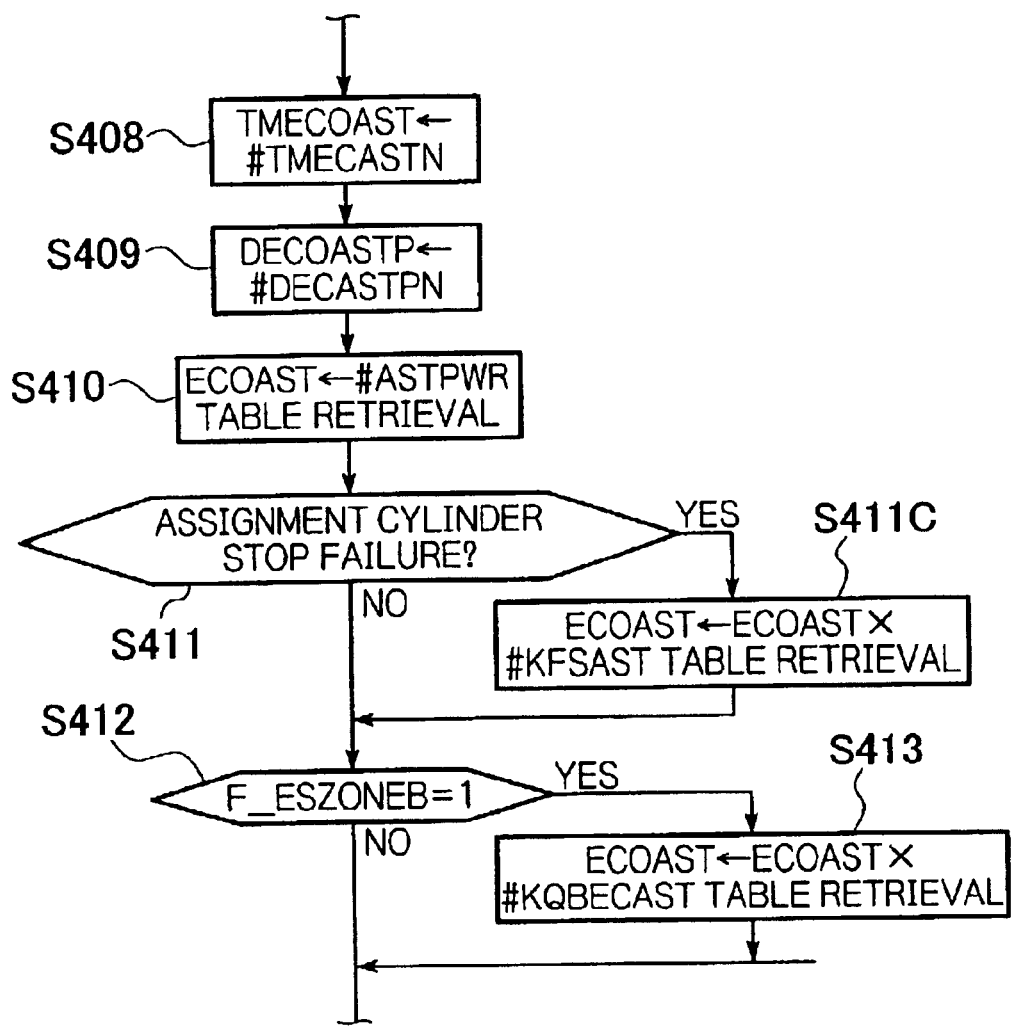
FIG. 8 is a flow chart showing the essential parts of another aspect of an ECO assist calculation process according to the embodiment of the present invention.

FIG. 8 is a flowchart partially replacing the flowchart shown in FIG. 6, and FIG. 8 shows the replaced part and the preceding and succeeding processes of the replaced part. Concretely speaking, the processes in step S411, step S411A and step S411B in the flow chart of FIG. 6 are replaced by step S410, step S411 and step S411C, as shown in FIG. 8. Accordingly, the other processes are the same as in the flowchart of FIG. 6 and hence explanations of the other steps are omitted.

In step S409, as mentioned earlier, the final ECO assist instruction value gradual incremental term DECOASTP is set to a predetermined gradual incremental term #DECASTPN, and the flow proceeds to step S410. In step S410, the ECO assist instruction value ECOAST is set to an assist amount #ASTPWR obtained by a table retrieval, and the flow proceeds to step S411. Note that this assist amount #ASTPWR is different for an MT vehicle and a CVT vehicle.

In step S411, it is determined whether assigned cylinder deactivation is failed. When the determination is "YES", the flow proceeds to step S411C, and when the determination is "NO", the flow proceeds to step S412.

In step S411C, a cylinder deactivation time correction coefficient #KFSAST is obtained by table retrieval of a cylinder deactivation failure time assist correction coefficient table determined depending on the engine rotation speed and inlet pipe negative pressure, a new ECO assist instruction value ECOAST is set to a value obtained by multiplying the ECO assist instruction value ECOAST and the cylinder deactivation time correction coefficient #KFSAST, and the flow proceeds to step S412. Note that this cylinder deactivation time correction coefficient #KFSAST is a value less than 1 (for example 0.7, 0.8, etc.), and the value corresponds to the limited assist amount in comparison with that at the normal time, that is, corresponds to the ECO assist instruction value ECOAST. This cylinder deactivation time correction coefficient #KFSAST is also different for an MT vehicle and a CVT vehicle.

Figure 9:
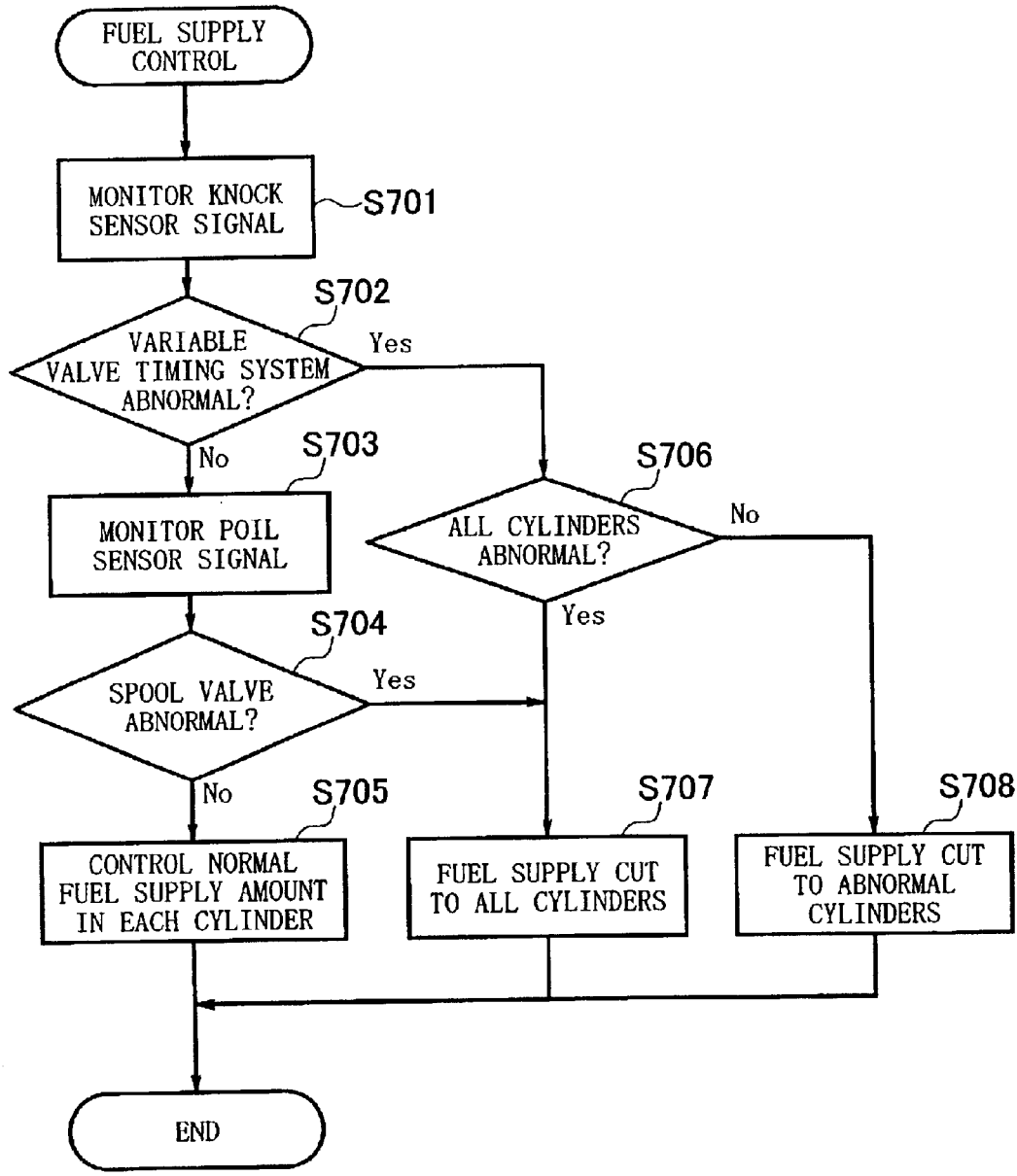
FIG. 9 is a flow chart showing fuel supply control according to the embodiment of the present invention.

Next is a description of fuel supply control in the case of abnormality detection based on the flowchart shown in FIG. 9.

In this flow chart, it is determined whether an abnormality has occurred in the variable valve timing mechanism VT for deactivating cylinders by detecting firing by the knock sensor S8, and when it is determined that the abnormality has occurred, engine driving force is maintained by the cylinders that are not deactivated, and also fuel supply to the cylinders in the deactivated state is stopped. This is because, for example, when the intake and exhaust ports are not fully closed because the variable valve timing mechanism VT fails, or when the spool valve 71 fails, it is desirable to stop the fuel supply. Note that the following process is repeated in a predetermined cycle.

In step S701 a knock sensor signal is monitored and the flow proceeds to step S702. This enables to detect a failure of a variable valve timing mechanism VT. Next, in step S702 it is determined whether there is an abnormality in a variable timing system VT from the result monitored in step S701. When the determination is "YES", the flow proceeds to step S706, and when the determination is "NO", the flow proceeds to step S703.

In step S706 it is determined whether there is an abnormality in all deactivation cylinders (three cylinders). When the determination is "YES", the fuel is cut to all cylinders in step S707, and the above procedure is repeated. When the determination in step S706 is "NO", fuel is only cut to failed cylinders with abnormality in step S708, and the above procedure is repeated.

In step S703 the POIL sensor S10 signal is monitored and the flow proceeds to step S704. In this manner, it is possible to monitor whether the pressure states of the cylinder deactivation side path 72 and cylinder deactivation cancellation side path 73 are normal. Next, in step S704 it is determined whether the spool valve 71 is abnormal or not from the result monitored in step S703. When the determination is "YES", the flow proceeds to step S707. When the determination is "NO", the flow proceeds to step S705, and the above procedure is repeated.

Therefore, according to the above-described embodiment, when it is determined in step S702 in FIG. 9 that the variable valve timing mechanism VT is abnormal or when it is determined in step S704 that the spool valve 71 is abnormal, since the extra regeneration energy, which would be maintained by reducing pumping losses if the cylinder deactivation operation were operating normally and the variable valve timing mechanism VT were functioning normally, is reduced, it is possible to cope with this problem by limiting the assist amount by the motor M in step S411C in FIG. 8. Therefore, it is possible to conduct appropriate energy management even when the deceleration cylinder deactivation system fails.

Especially, when performing ECO assist in a low load state of the engine E in which a driver's acceleration intention is not so great even in acceleration mode, it is possible to limit (step S411A and step S411C) the output of the motor M without giving the driver an incompatible feeling, and thereby enabling appropriate energy management without reducing the merit of cylinder deactivation engine even when cylinder deactivation fails.

Furthermore, when the above-described cylinder deactivation engine fails, that is when cylinder deactivation is not executed due to a failure of the variable valve timing mechanism VT, the assist amount is corrected downwards by using a table wherein the assist amount is reduced, or by using a correction coefficient less than 1, and the assist of the engine E by the motor M can be performed with the reduced assist amount. Hence it is possible to prevent an adverse influence on energy management caused by excess electrical energy consumption.

On the other hand, when the state of charge of the battery is lower than 40% for example, which is the boundary between zone A and zone B, the assist amount is reduced in step S413, and thereby it is possible to assist the engine E by the motor M while preventing further reduction of the state of charge of the battery. At the same time, it is also possible to satisfy the driver's acceleration intention to a certain degree depending on the state of charge of the battery while suppressing the reduction of state of charge of the battery as much as possible.

Furthermore, when the state of charge of the battery is less than 25% for example, which is the boundary between zone B and zone C, it is possible to stop further reduction of the state of charge of the battery by prohibiting (step S403 and step S404) the assist by the motor M, and hence it is possible to maintain a minimum required state of charge of the battery.

In this invention, a case where a battery is used in order to drive a motor is described. It is also possible to use a capacitor instead of a battery. Furthermore, the deactivation operation can be conducted if the engine E has more than one cylinder which is applicable to the deactivation operation. Moreover, when setting a limited ECO assist amount at the time of cylinder deactivation failure, the present invention makes it possible to reduce only the assist amount corresponding to the pumping loss of the failed deactivation cylinder, and thereby generation and consumption of energy is balanced, and an appropriate energy management can be achieved.

As described above, according to the first aspect of the invention, if the abnormality detection device detects an abnormality of a cylinder deactivation engine, since regeneration energy, which would be recovered by reducing pumping losses when cylinder deactivation operation were conducted normally, is reduced, the motor assist of the engine is limited by the motor output limiting device, so that it is possible to cope with failure of the deactivation cylinder failure. Therefore, there is an effect that even when the deceleration cylinder deactivation system fails, it is possible to conduct appropriate energy management.

According to the second aspect of the invention, in addition to the effect of the first aspect of the invention, it is possible to limit the output of the motor without giving the driver an incompatible feeling in a low engine load state in which the driver's acceleration intention is low. Therefore, there is an effect in that appropriate energy management is possible at the time of cylinder deactivation failure without reducing the merit of the cylinder deactivation engine.

According to the third aspect of the invention, in addition to the effect of the first aspect of the invention, when a cylinder deactivation engine fails, it is possible to perform engine assist by the motor using a table in which the assist amount is reduced. Therefore, there is an effect that it is possible to prevent an adverse influence on energy management caused by excess electrical energy consumption.

According to the fourth aspect of the invention, in addition to the effect of the first aspect of the invention, when a cylinder deactivation engine fails it is possible to perform engine assist by the motor by reducing the assist amount by a correction coefficient. Therefore, there is an effect that it is possible to prevent an adverse influence on energy management caused by excess electrical energy consumption.

According to the fifth aspect of the invention, in addition to the effect of the first aspect of the invention, when the state of charge of the battery is lower than a predetermined first threshold, it is possible to use the motor for the motor assist while preventing the state of charge of the battery from being reduced further. Therefore, there is an effect that it is possible to satisfy the driver's acceleration intention to a certain degree depending on the state of charge of the battery while preventing a reduction of state of charge of the battery as much as possible.

According to the sixth aspect of the invention, in addition to the effect of the fifth aspect of the invention, when the state of charge of the battery is less than or equal to a second threshold, it is possible to prohibit the motor assist and to prevent the state of charge of the battery from being reduced further. Therefore, there is an effect that it is possible to maintain a minimum required state of charge of the battery.

What is claimed is:

1. A hybrid vehicle comprising:

an engine and a motor as its drive sources; and a control device, wherein the control device is configured to stop fuel supply to the engine at the time of vehicle deceleration, and to perform regenerative braking by the motor depending on a deceleration state, wherein said engine is a cylinder deactivation engine capable of switching between all cylinder operation for operating all cylinders and cylinder deactivation operation for deactivating more than one cylinder, said cylinder deactivation operation being performed depending on at least the deceleration state of said vehicle to reduce pumping losses of the engine, so that the regeneration efficiency of the motor is improved, and wherein said control device comprises:
an abnormality detection device which detects abnormality in said cylinder deactivation engine; and
a motor output limiting device which reduces the output of said motor when an abnormality in the cylinder deactivation engine is detected by said abnormality detection device.

2. The hybrid vehicle according to claim 1, wherein said control device detects the traveling condition of the engine, and the output of the motor is limited in a low engine load state.

3. The hybrid vehicle according to claim 1, wherein the control device limits the output of the motor by said motor output limiting device based on a table in which the amount of engine assist by the motor is reduced compared with the amount of engine assist by the motor prior to the detection of the abnormality in said cylinder deactivation engine.

4. The hybrid vehicle according to claim 1, wherein the control device reduces the output of the motor by the motor output limiting device based on a correction coefficient of less than one by multiplying the current amount of engine assist by the motor by the correction coefficient.

5. The hybrid vehicle according to claim 1, wherein the control device further comprises a processing system configured to detect a state of a charge of a battery, and to compare the state of the charge to a first threshold, and wherein the motor output limiting device is further configured to reduce the motor output when the state of the charge is less than the first threshold.

6. The hybrid vehicle according to claim 5, wherein the processing system is further configured to compare the state of the charge to a second threshold which is less than the first threshold, and the motor output limiting device is further configured to prohibit the output to the motor when the state of the charge is less than the second threshold.

* * * * *